US012510239B2

(12) United States Patent
Zou

(10) Patent No.: US 12,510,239 B2
(45) Date of Patent: Dec. 30, 2025

(54) STRING LIGHT AND METHOD FOR STRING LIGHT

(71) Applicant: Sijun Zou, Meizhou (CN)

(72) Inventor: Sijun Zou, Meizhou (CN)

( * ) Notice: Subject to any disclaimer, the term of this patent is extended or adjusted under 35 U.S.C. 154(b) by 0 days.

(21) Appl. No.: 18/913,863

(22) Filed: Oct. 11, 2024

(65) Prior Publication Data

US 2025/0383076 A1 Dec. 18, 2025

Related U.S. Application Data

(63) Continuation-in-part of application No. 18/745,110, filed on Jun. 17, 2024.

(51) Int. Cl.

| | |
|---|---|
| ***F21V 31/00*** | (2006.01) |
| ***F21S 4/10*** | (2016.01) |
| ***F21V 23/06*** | (2006.01) |
| ***F21Y 103/10*** | (2016.01) |

(52) U.S. Cl.

CPC .............. *F21V 31/005* (2013.01); *F21S 4/10* (2016.01); *F21V 23/06* (2013.01); *F21Y 2103/10* (2016.08)

(58) Field of Classification Search

CPC ............ F21K 9/20–278; F21S 4/00–26; F21V 19/00–006; F21V 23/06; F21V 31/00–005; F21Y 2103/10; F21Y 2115/10

See application file for complete search history.

(56) References Cited

U.S. PATENT DOCUMENTS

| | | | | |
|---|---|---|---|---|
| 7,575,362 B1 * | 8/2009 | Hsu | H01R 33/09 | 362/652 |
| 11,703,215 B2 * | 7/2023 | Li | F21K 9/232 | 362/257 |
| 2023/0296239 A1 * | 9/2023 | Zou | F21V 31/005 | 362/249.16 |

* cited by examiner

*Primary Examiner* — Jason M Han

(57) ABSTRACT

A string light is provided, comprises a bulb, a holder which is provided with a bulb on one side and a wire slot on the other side, a power line which goes through the wire slot and the holder, a waterproof housing which has a cavity that contains the holder and is toward the bulb, and a stopper located in the space between the waterproof housing and the bulb; wherein the power line is electrically connected to the bulb, at least a portion of the waterproof housing is mounted to the holder, and the stopper seals the wire slot.

20 Claims, 21 Drawing Sheets

STRING LIGHT AND METHOD FOR STRING LIGHT

CROSS REFERENCE TO RELATED APPLICATION

This application is a continuation in part of U.S. application Ser. No. 18/745,110, entitled "LIGHT EMITTING DIODE (LED) LIGHT BULB AND STRING LIGHT USING LED LIGHT BULB," filed Jun. 17, 2024, and the entire contents of which are incorporated herein by reference.

FIELD OF TECHNOLOGY

This application relates to the technical field of lighting, and particularly relates to a string light and a method for string light.

BACKGROUND

To heighten the festive atmosphere or activity atmosphere, a string light is usually used for decoration. The string light includes lamp holders electrically connected in sequence through a power line, and each lamp holder is provided with a light bulb.

However, there are rubber leakage problems with light bulbs, which leads to lower yield.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a string light is provided, comprising:

a bulb;

a holder, which is provided with the bulb on one side and a wire slot on the other side;

a power line, which goes through the wire slot and the holder, is electrically connected to the bulb;

a waterproof housing, which has a cavity that contains the holder and is toward the bulb, at least a portion of which is mounted to the holder; and a stopper located in the space between the waterproof housing and the bulb;

wherein the stopper seals the wire slot.

In another aspect, a string light is provided, comprising:

a bulb;

a holder, which is provided with a bulb on one side and a wire slot on the other side;

a waterproof housing having a cavity for containing the holder to which the bulb is mounted; and a stopper located in the space between the waterproof housing and the bulb;

wherein the stopper seals the wire slot.

In another aspect, a method for string light, comprising:

providing a bulb;

providing a holder, which is provided with the bulb on one side and a wire slot on the other side;

providing a power line, which goes through the wire slot and the holder, wherein the power line is electrically connected to the bulb;

providing a waterproof housing, which has a cavity that contains the holder and is toward the bulb, wherein at least a portion of which is mounted to the holder;

providing a stopper located in the space between the waterproof housing and the bulb;

wherein the stopper seals the wire slot.

The above aspects or examples and advantages, as well as other aspects or examples and advantages, will become apparent from the ensuing description and accompanying drawings.

BRIEF DESCRIPTION OF THE DRAWINGS

The present invention will be further described below by means of the drawings, but the embodiments in the drawings do not limit the present invention by any means.

In FIGS. 1-30,

Figure 1:
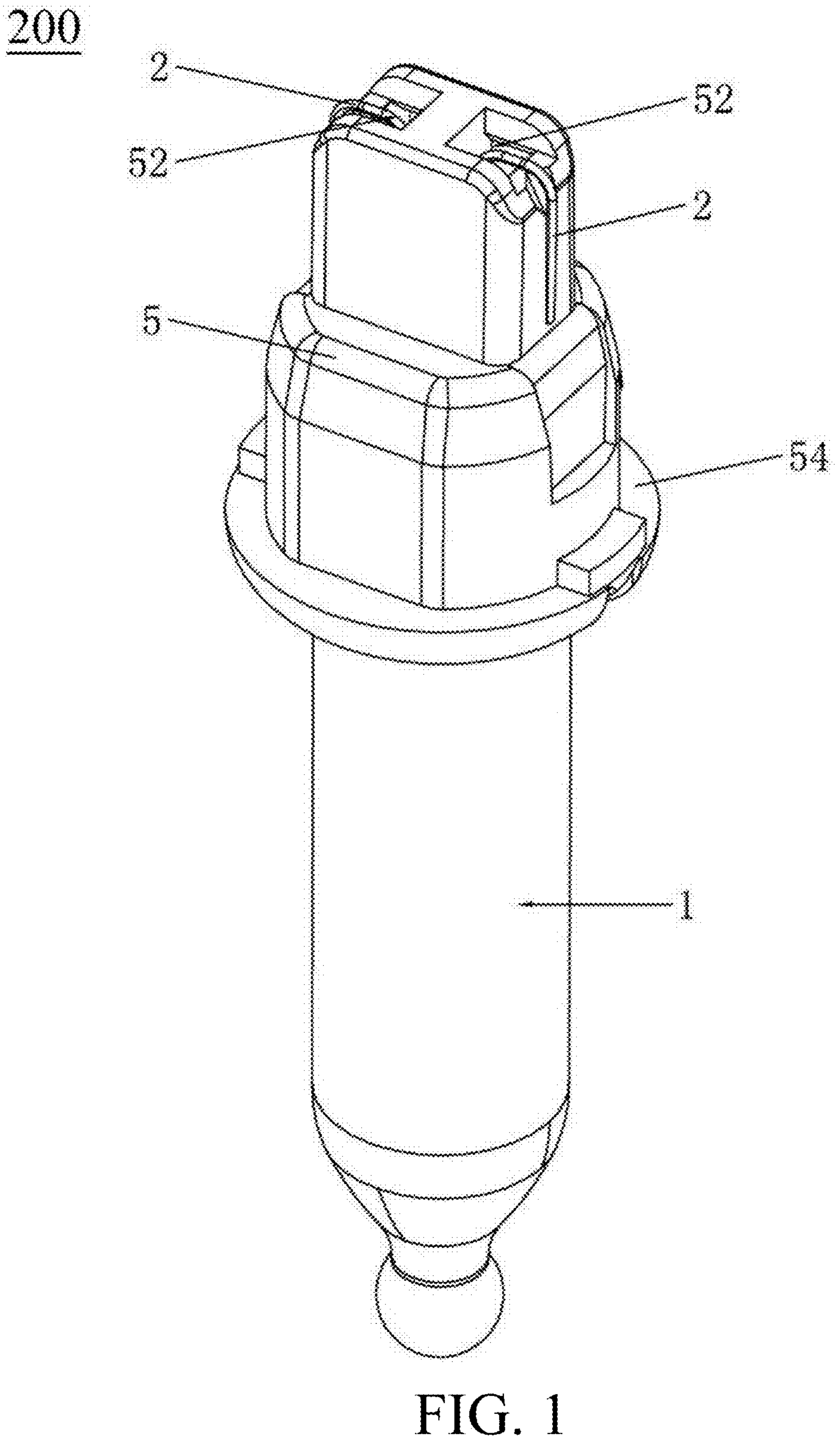
FIG. 1 is a schematic view of the structure of a light bulb in an embodiment of the present application.

100—string light; 200—bulb; 1—lamp housing; 11—clamping portion; 2—electrical contact; 3—lamp bead; 4—waterproof rubber; 5—rubber core; 51—mounting hole; 52—through hole; 53—limiting and stopping portion; 54—shoulder; 6—power line; 71—male connector; 72—female connector; 8—holder; 81—insertion hole; 82—wire slot; 83—lug slot; 84—opening; 9—lug; 10—stopper; 101—first tab; 102—second tab; 12—waterproof housing.

DESCRIPTION OF THE EMBODIMENTS

The present invention is described below in combination with specific implementation modes.

As shown in FIGS. 1-5, a light emitting diode (LED) bulb 200 is provided, comprises a light source, a lamp housing 1, and a plurality of electrical contacts 2, wherein the light source includes a lamp bead 3, each of the electrical contacts 2 is electrically connected to the corresponding connecting terminal of the lamp bead 3, and the electrical connection is made by means of, but not limited to, SMD welding, clamping, and the like; the lamp bead 3 is encapsulated by a waterproof rubber 4, in this embodiment, the lamp bead 3 is an LED lamp bead with a red-green-blue (RGB) function.

The lamp housing 1 is formed by injection molding; it is understandable that, in some embodiments, the lamp housing 1 formed by other process methods is also available.

Figure 2:
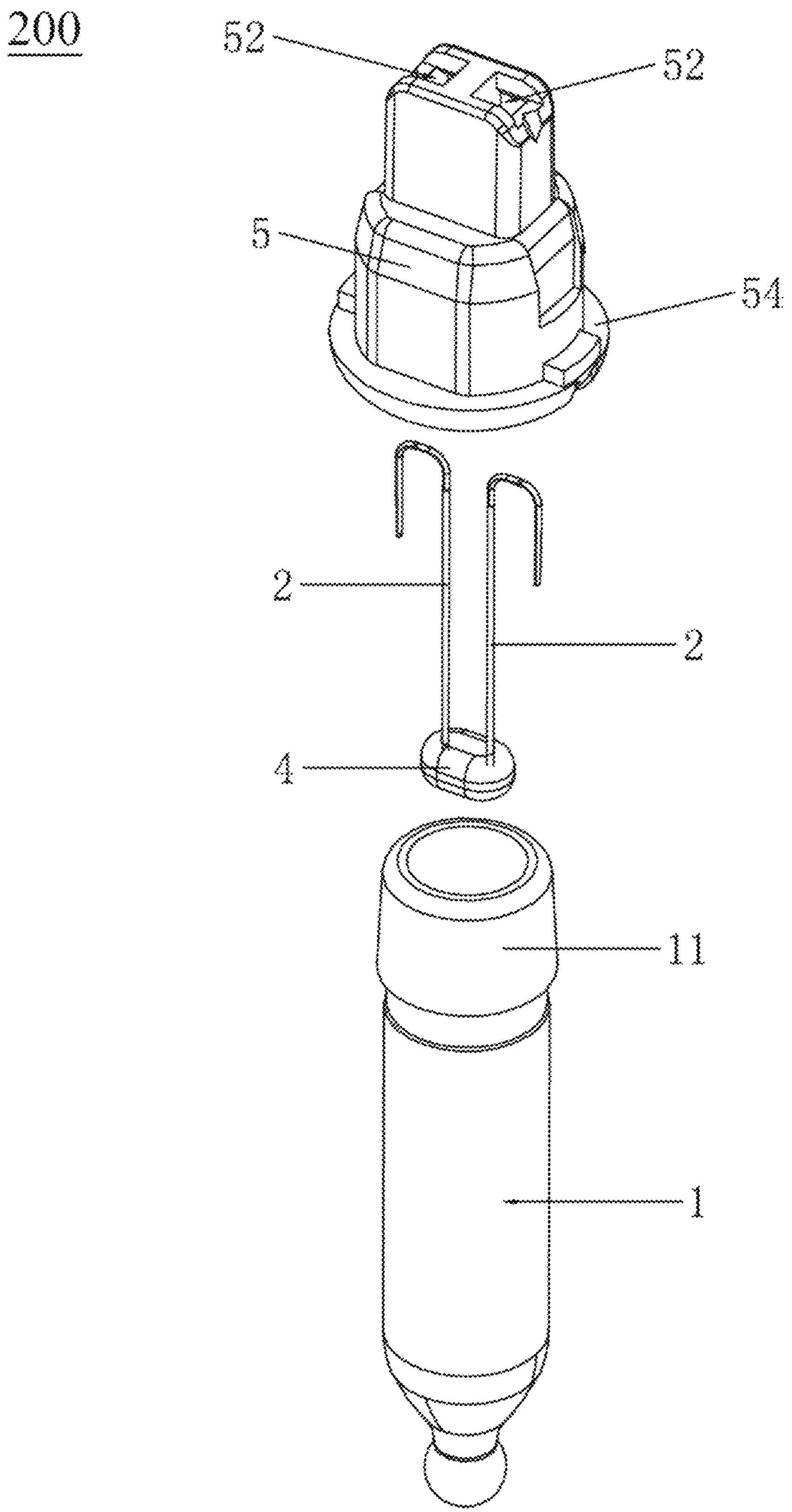
FIG. 2 is a schematic view of an exploded structure of the light bulb shown in FIG. 1.
Figure 3:
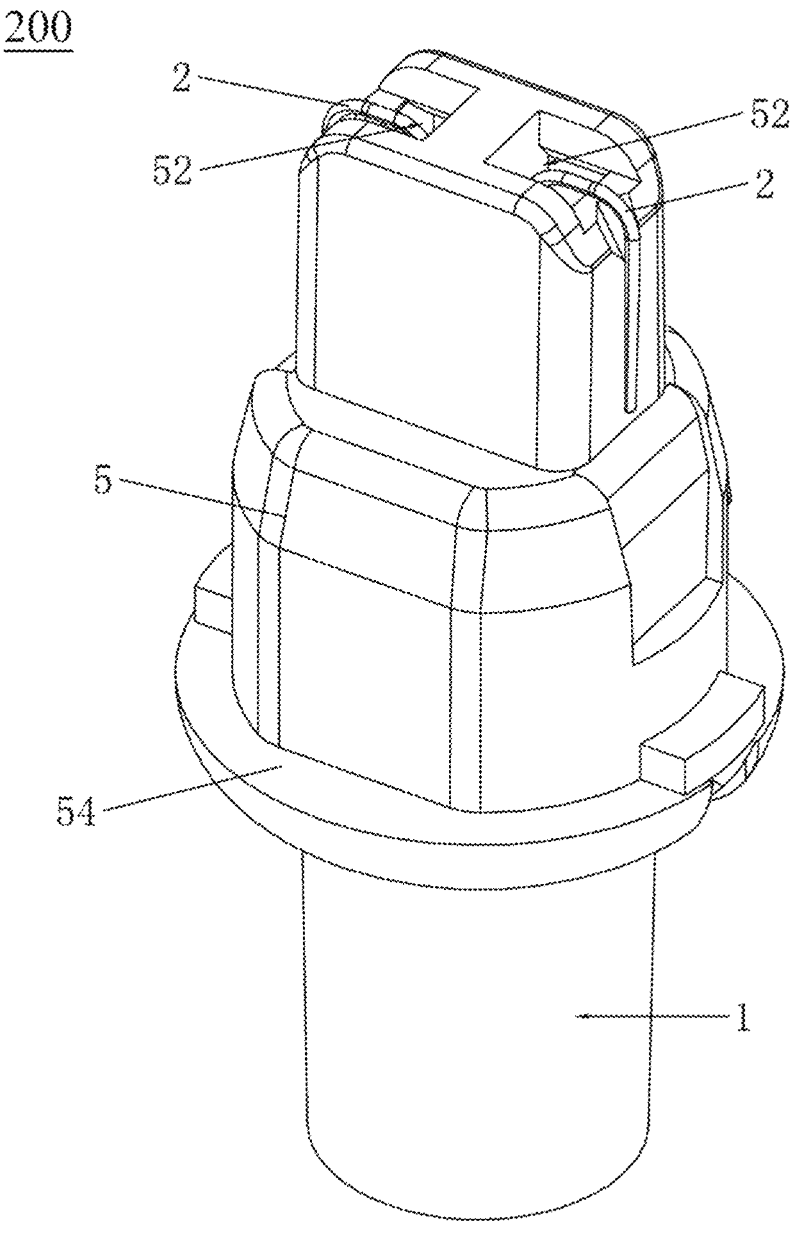
FIG. 3 is a schematic view of the structure of a light bulb in another embodiment of the present application.
Figure 4:
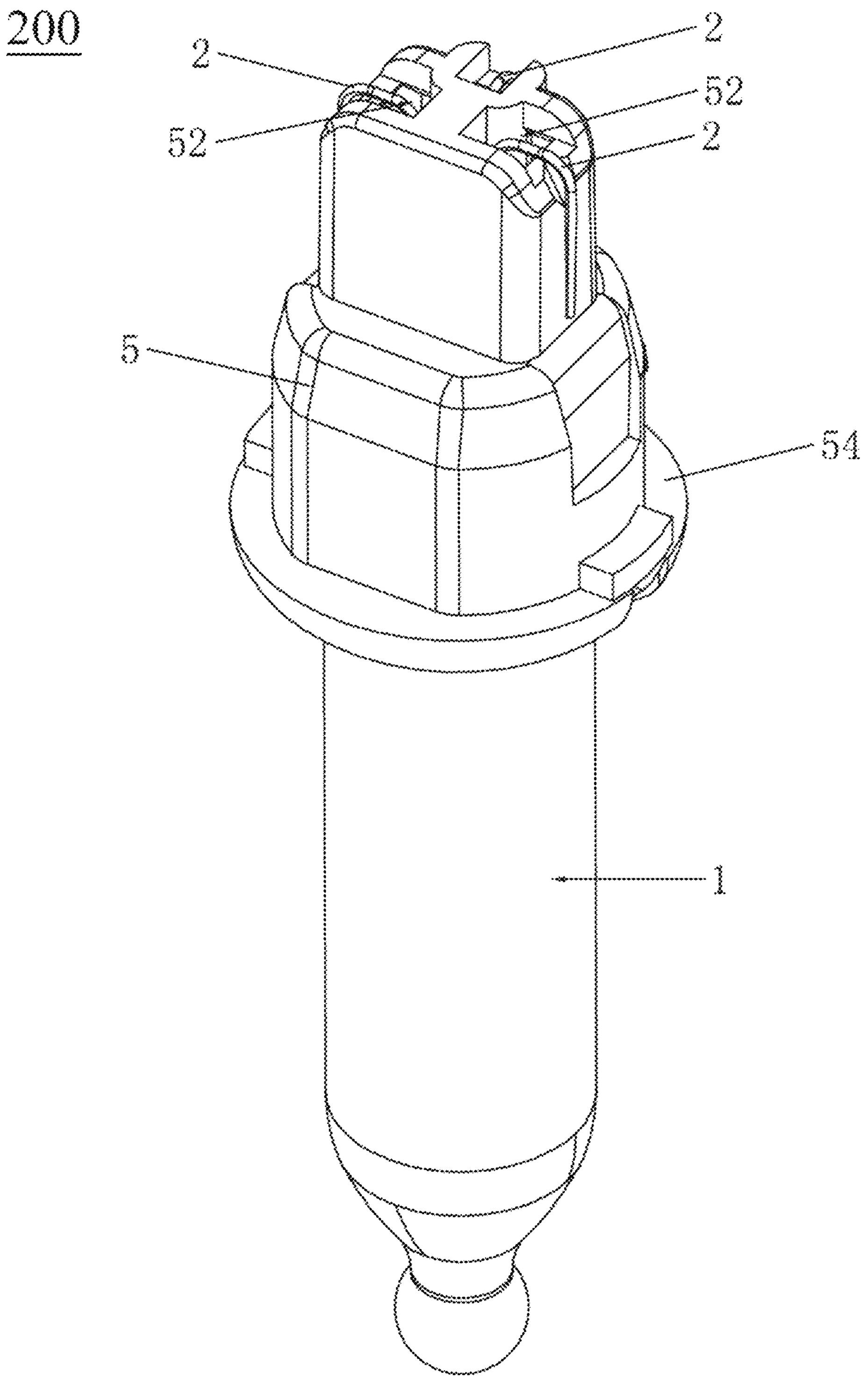
FIG. 4 is a schematic view of the structure of a light bulb in another embodiment of the present application.
Figure 5:
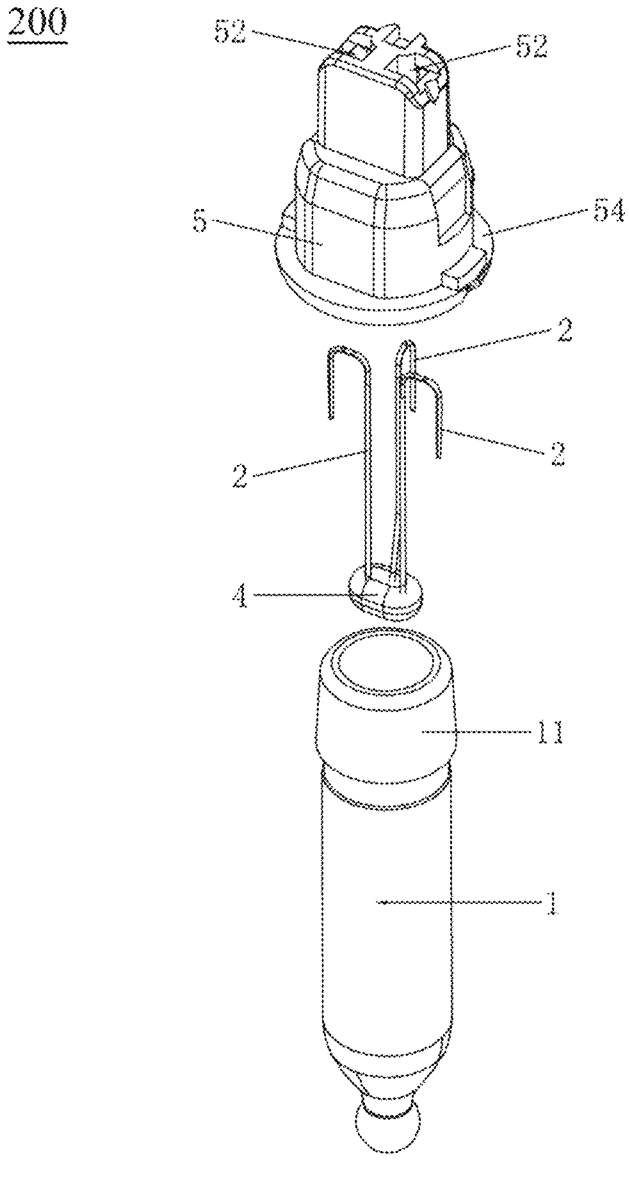
FIG. 5 is a schematic view of the exploded structure of the bulb shown in FIG. 4.

As shown in FIGS. 1-3, two electrical contacts 2 are electrically connected to the lamp bead 3; or, as shown in FIGS. 4-5, three electrical contacts 2 are electrically connected to the lamp bead 3; it is understandable that, in some embodiments, the number of electrical contacts 2 is but not limited to 4, 5, and 6.

The bulb 200 further comprises a rubber core 5, a mounting hole 51 is formed at one end of the rubber core 5, and a through hole 52 is formed at the other end of the rubber core 5; the through hole 52 is communicated with the mounting hole 51, and the lamp bead 3 is connected to and supported by the rubber core 5.

The lamp bead 3 is located in the lamp housing 1; it is understandable that, in some embodiment, the lamp bead 3 is located in the mounting hole 51.

One end of the lamp housing 1 toward the rubber core 5, which has a cavity structure with an opening, is inserted in the mounting hole 51.

Each electrical contact 2 goes through the mounting hole 51, through the through hole 52, bends towards the outer side of the through hole 52, and extends towards the outer wall of the rubber core 5 in sequence.

The electrical contact 2 is a bent pin; it is understandable that, in some embodiment, the electrical contact 2 is also available in other shapes.

It is to be noted that, in this embodiment, the bulb 200 is matched with a holder 8 of a string light 100, and a power line 6 of the string light 100 is provided with lugs 9 corresponding to each electrical contact 2 respectively; in the process of mounting the bulb 200 into the holder 8, each lug 9 is pressed by the holder 8 so that each electrical contact 2 is in contact and in electrical conduction with the corresponding lug 9, which make it convenient to be assembled.

Figure 6:
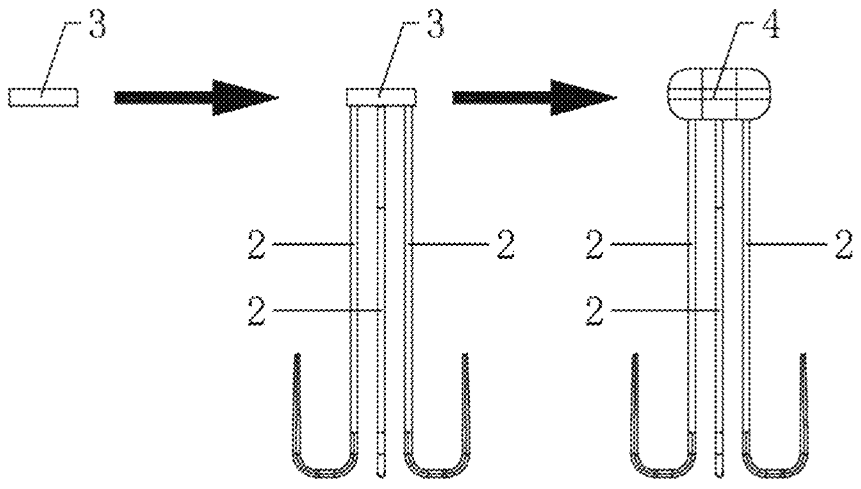
FIG. 6 is a schematic view of the assembly process of the lamp bead shown in FIG. 5.

The preparation process of the bulb 200 is shown in FIG. 6, making each of the electrical contacts 2 in SMD welding with the corresponding connecting terminal of the lamp bead 3 first, then forming the waterproof rubber 4 at the periphery of the lamp bead 3 by dispensing encapsulation, after that, placing the lamp bead 3 into the mounting hole 51 of the rubber core 5 from bottom to top, making each electrical contact 2 goes through the corresponding through hole 52 of the rubber core 5, then bending each electrical contact 2 towards the outer side of the through hole 52 and towards the outer wall of the rubber core 5, then keeping the tail end of each electrical contact 2 against the outer wall of the rubber core 5, after that, inserting the lamp housing 1 into the mounting hole 51 of the rubber core 5 to finish the preparation process of the LED light bulb 200.

In conclusion, compared with the prior art, the LED light bulb 200 has a new structure, making it possible for a simple assembly process and a low preparation cost.

Figure 9:
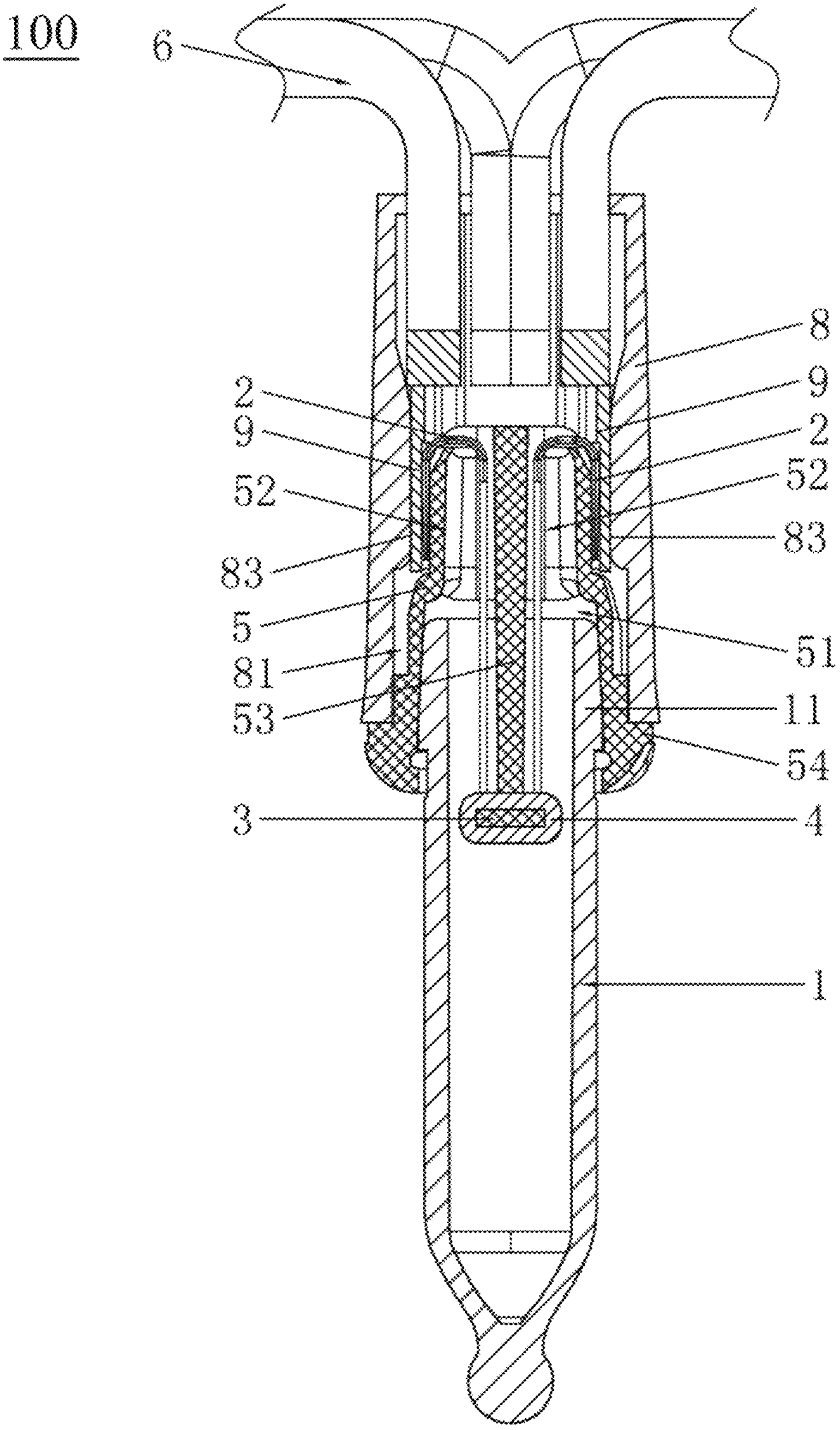
FIG. 9 is a schematic view of the sectional structure of the string light shown in FIG. 8.
Figure 10:
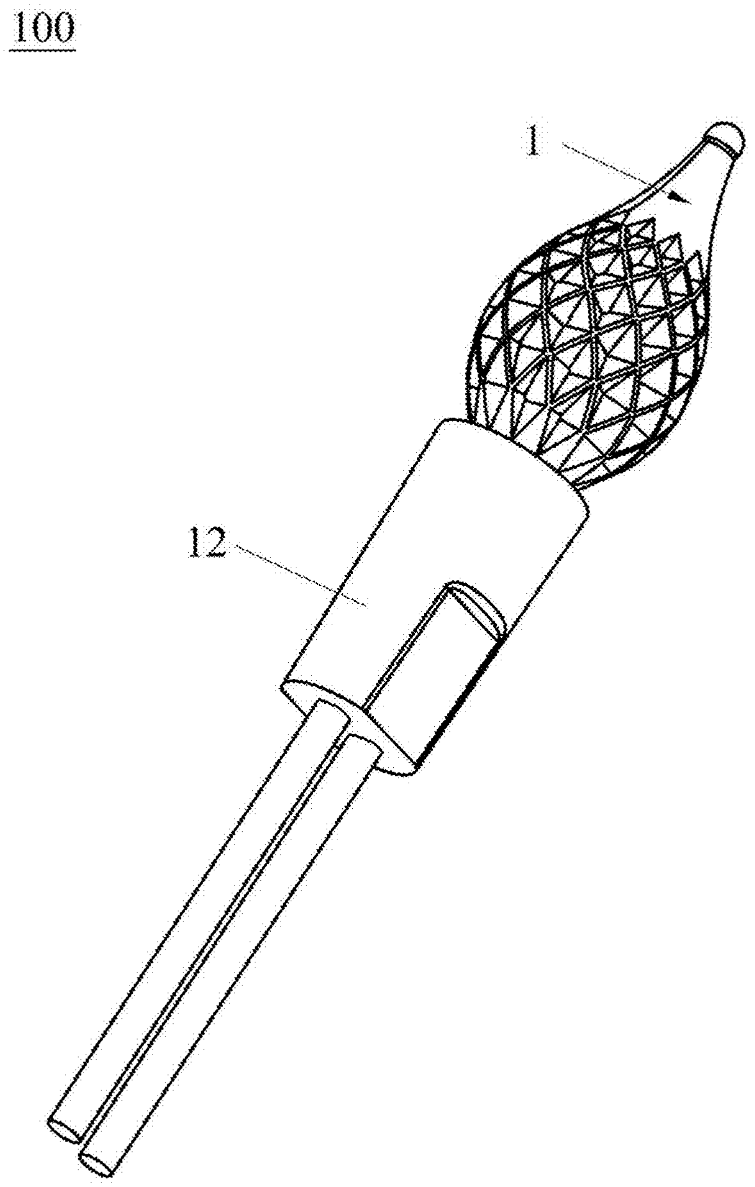
FIG. 10 is a schematic view of the structure of a string light in another embodiment of the present application.
Figure 11:
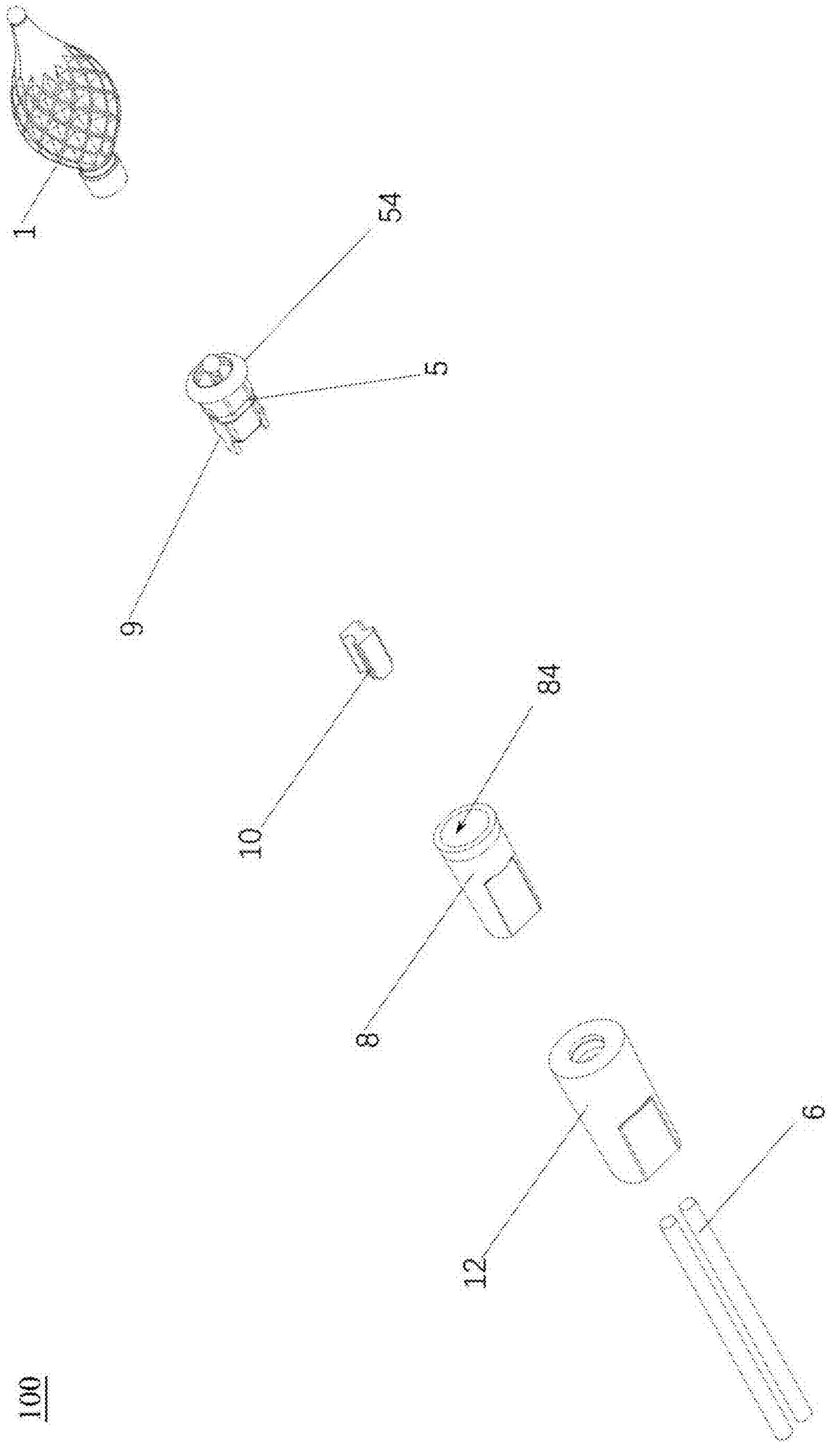
FIG. 11 is a schematic view of the exploded structure of the string lights shown in FIG. 10.

As shown in FIG. 9, the rubber core 5 has a limiting and stopping portion 53, which extends vertically from the lamp bead 3 through the mounting hole 51 and toward the through hole 52, and the limiting and stopping portion 53 and the rubber core 5 are of an integrated structure, and the waterproof rubber 4 is coated on the periphery of the lamp bead 3 and leans against the lower surface of the limiting and stopping portion 53. By adding the limiting and stopping portion 53, when the lamp bead 3 is mounted to the mounting hole 51 of the rubber core 5, the limiting and stopping portion 53 can block and limit the lamp bead 3, making it more convenient for assembly.

As shown in FIG. 2, FIG. 5, FIG. 8, FIG. 9, and FIGS. 14-29, an end of the lamp housing 1 toward the mounting hole 51 has a clamping portion 11; the clamping portion 11 of the lamp housing 1 is embedded in the mounting hole 51, and an outer wall of the clamping portion 11 is stuck on the inner wall of the mounting hole 51. By adding the clamping portion 11, the plug-in connection between the lamp housing 1 and the rubber core 5 is more stable and reliable, with better sealing performance and waterproof performance.

As shown in FIGS. 1-7 and FIG. 11, the outer wall of the rubber core 5 is provided with a shoulder 54. By adding the shoulder 54, during the process of inserting the rubber core 5 into the holder 8, the inserting position can be limited by the shoulder 54 to ensure that the rubber core 5 is accurately inserted in the holder 8.

As shown in FIGS. 7-11, a string light 100 is provided, comprises a bulb 200, holders 8, and a power line 6.

Figure 7:
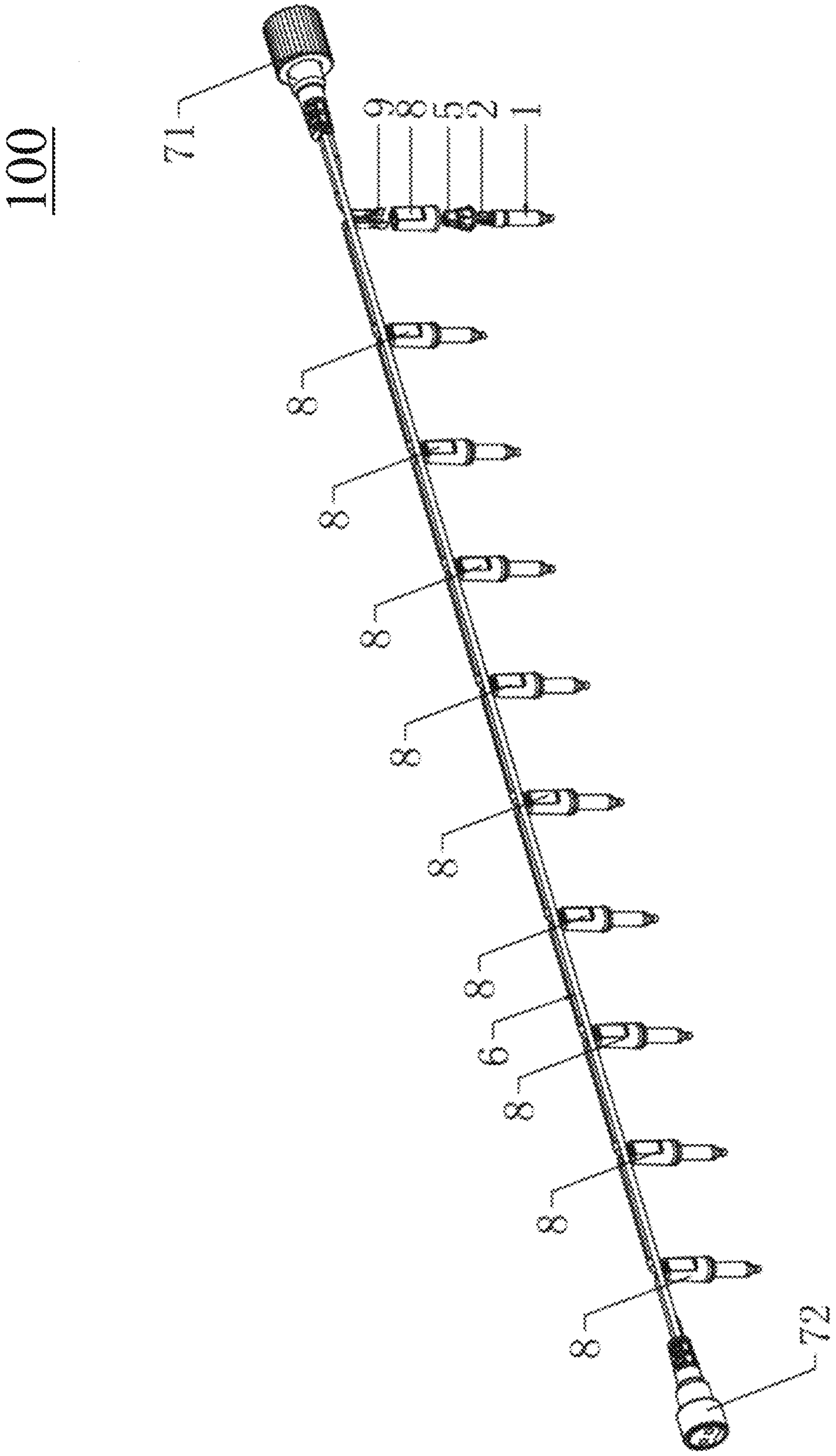
FIG. 7 is a schematic view of the structure of a string light in an embodiment of the present application.
Figure 8:
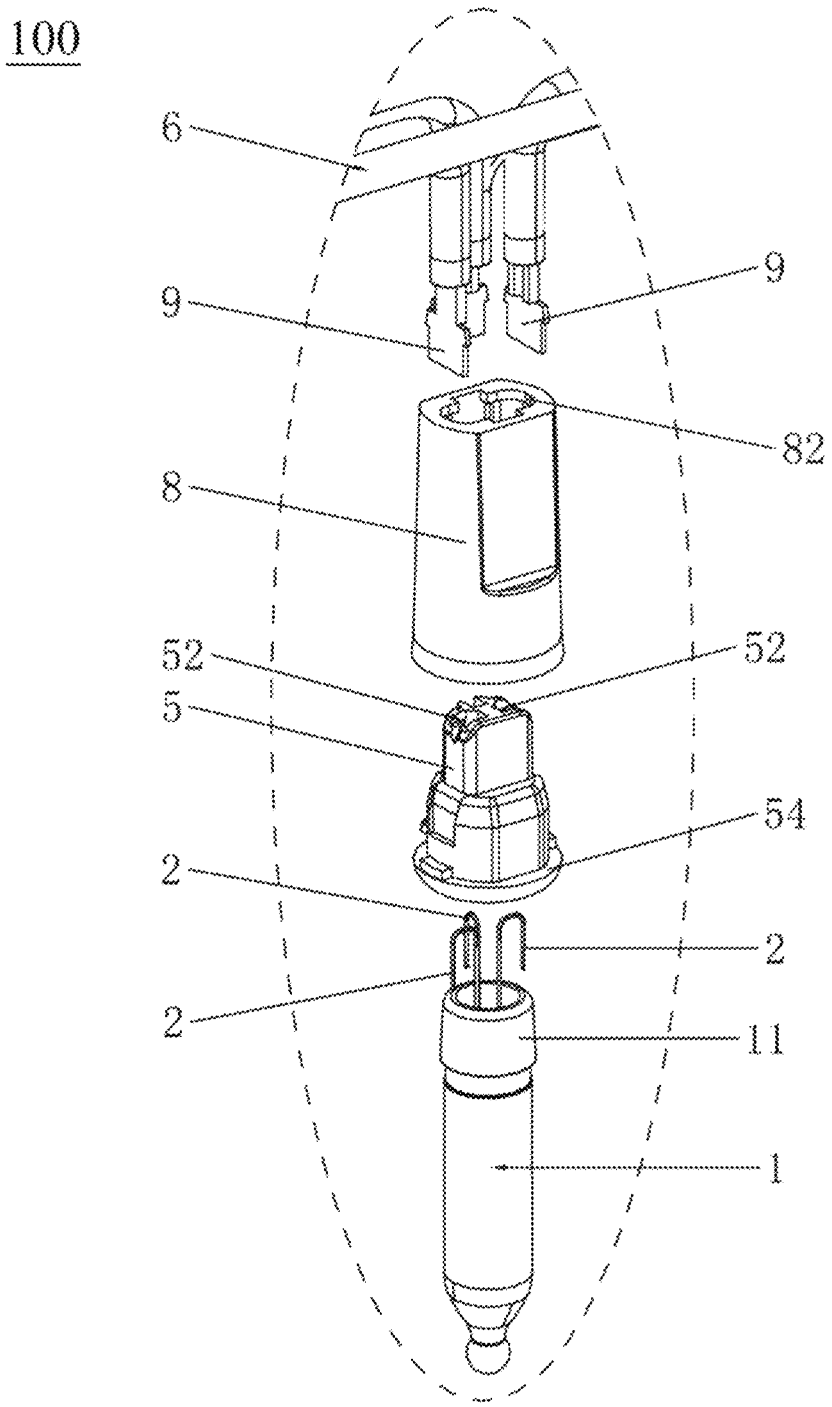
FIG. 8 is a schematic view of an exploded structure of a string light in another embodiment of the present application.

As shown in FIGS. 6-7, the holders 8 are mounted to the power line 6 in sequence, each holder 8 is provided with the bulb 200 on one side and a wire slot 82 on the other side, the wire slot 82 is toward the power line 6, and the holder 8 has a insertion hole 81 opening towards the bulb 200 and communicating with the wire slot 82.

The insertion hole 81 has an opening 84 and at least a part of the bulb 200 goes into the insertion hole 81 via the opening 84 and is mounted to the holder 8.

The power line 6 extends into the insertion hole 81 of the holder 8 via the wire slot 82 and is electrically connected to the corresponding lugs 9 inside the insertion hole 81 respectively; in the process of mounting the bulb 200 into the holder 8, each lug 9 is pressed by the holder 8 so that each electrical contact 2 is in contact and in electrical conduction with the corresponding lug 9; by adding the wire slot 82, the power line 6 goes through the wire slot 82 and the holder 8, and is electrically connected to the bulb 200, which make it possible to effectively improve the stability and reliability of the connection between the holder 8 and the power line 6.

An inner wall of the insertion hole 81 is provided with a lug slot 83 corresponding to each lug 9, and each lug 9 is positioned and clamped in the corresponding lug slot 83; in the assembly process of the lugs 9, each lug 9 is embedded and limited in the corresponding lug slot 83 so that each lug 9 is accurately positioned and mounted.

The string light 100 further comprises a waterproof housing 12, the waterproof housing 12 has a cavity open toward the holder 8 for containing the holder 8.

The string light 100 further comprises a stopper 10, the stopper 10 is located in the space between the waterproof housing 12 and the bulb 200, and the stopper 10 seals the portion of the wire slot 82 located around the power line 6.

Figure 12:
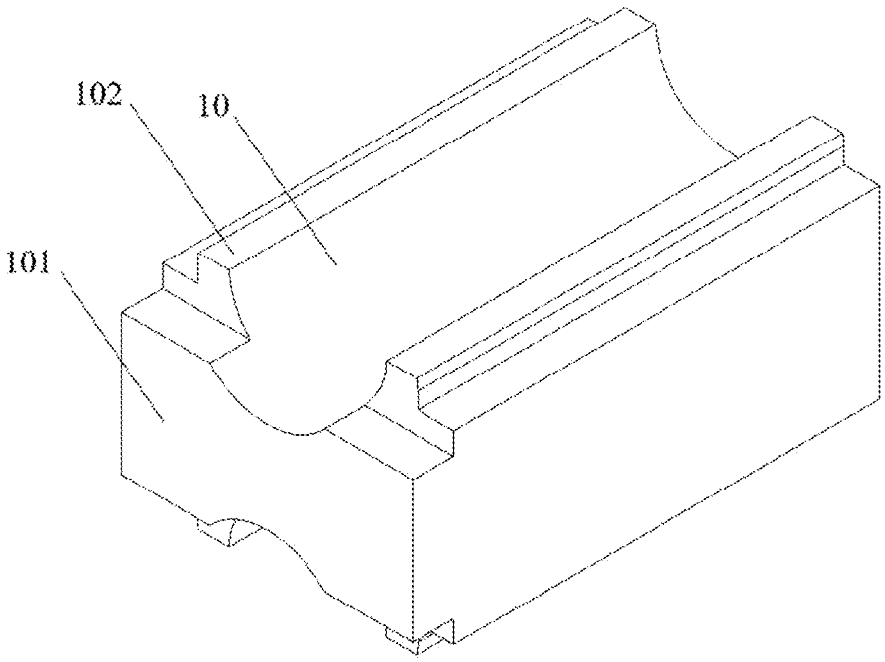
FIG. 12 is a schematic view of the structure of a stopper in an embodiment of the present application.

As shown in FIG. 12, in an example of the stopper 10, the stopper 10 is a block, which is mounted on the rubber core 5 inside the holder 8 and has a first tab 101, which is on a side of the block toward the wire slot 82 and has a shape matching that of the wire slot 82, wherein the first tab 101 is embedded in the wire slot 82 thereby enclosing and sealing the portion of the wire slot 82 located around the power line 6.

In this example, the block has two opposing side walls on two sides of the first tab 101, respectively, the holder 8 also has two opposite inner walls respectively toward the two opposing side walls of the block, each of the two inner walls of the holder 8 has a slot thereon, each of the two side walls of the block has a second tab 102 thereon, the second tab 102 is embedded in the slot on the inner wall of the holder 8 so that the block is fixed inside the holder 8.

Figure 13:
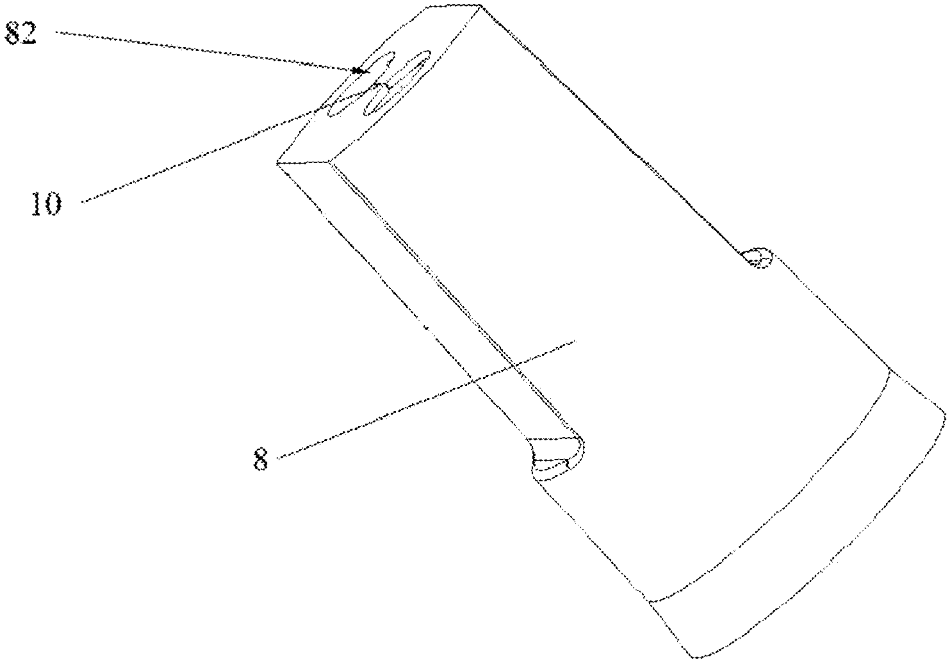
FIG. 13 is a schematic view of the structure of a stopper in another embodiment of the present application.
Figure 14:
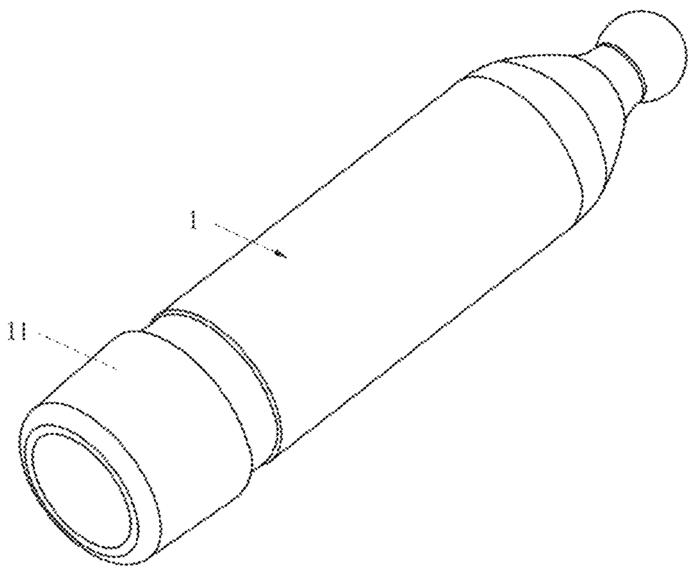
FIG. 14 is a schematic view of the structure of a lamp housing in an embodiment of the present application.
Figure 15:
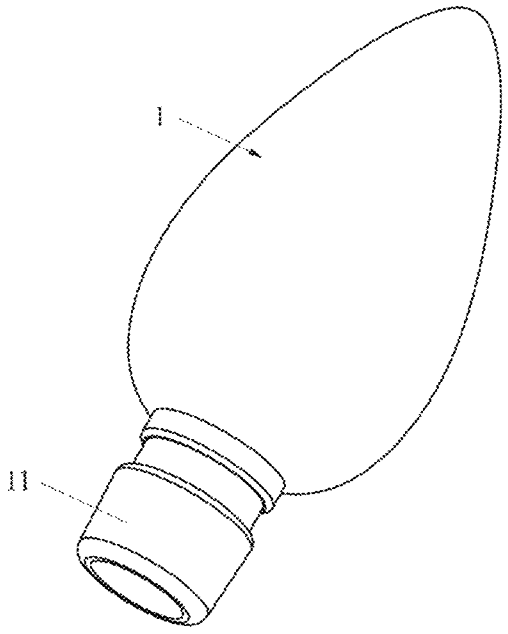
FIG. 15 is a schematic view of the structure of a lamp housing in another embodiment of the present application.
Figure 16:
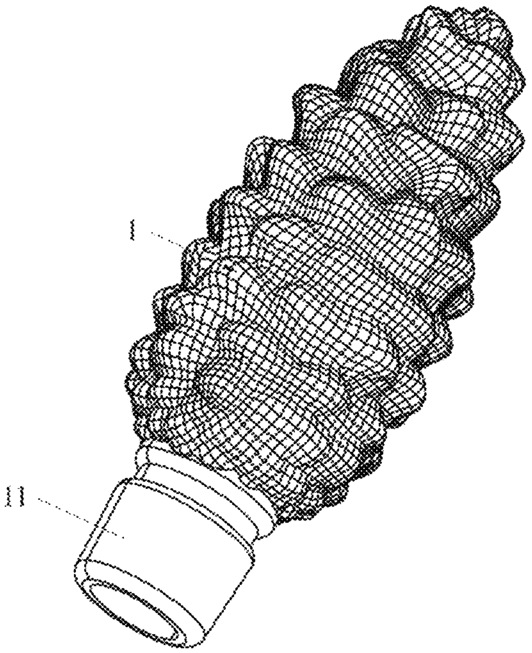
FIG. 16 is a schematic view of the structure of a lamp housing in another embodiment of the present application.
Figure 17:
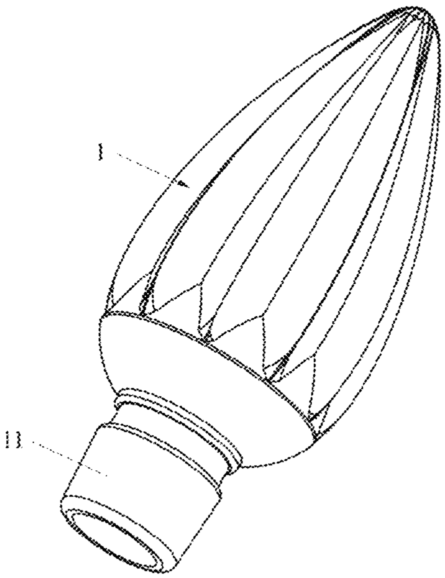
FIG. 17 is a schematic view of the structure of a lamp housing in another embodiment of the present application.
Figure 18:
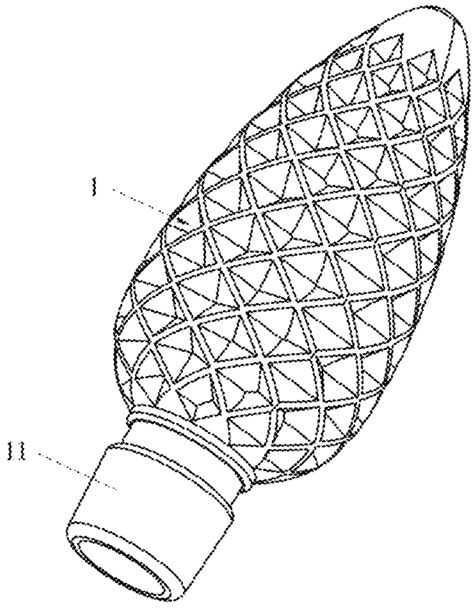
FIG. 18 is a schematic view of the structure of a lamp housing in another embodiment of the present application.
Figure 19:
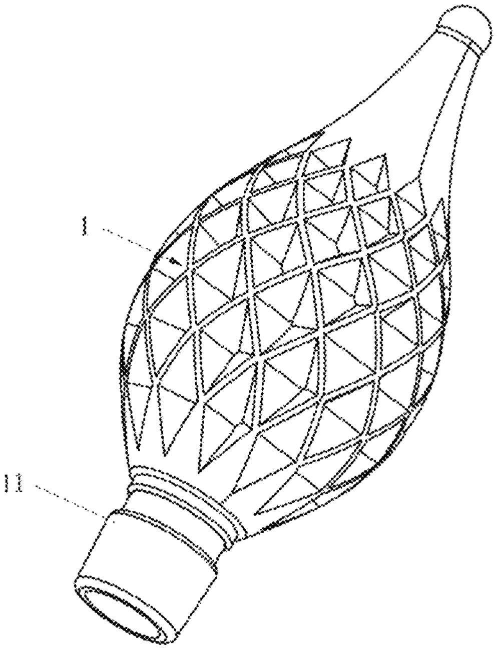
FIG. 19 is a schematic view of the structure of a lamp housing in another embodiment of the present application.
Figure 20:
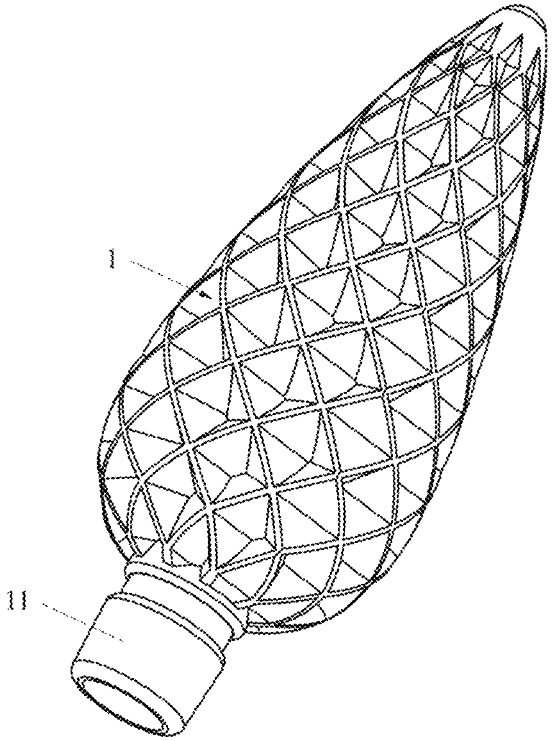
FIG. 20 is a schematic view of the structure of a lamp housing in another embodiment of the present application.
Figure 21:
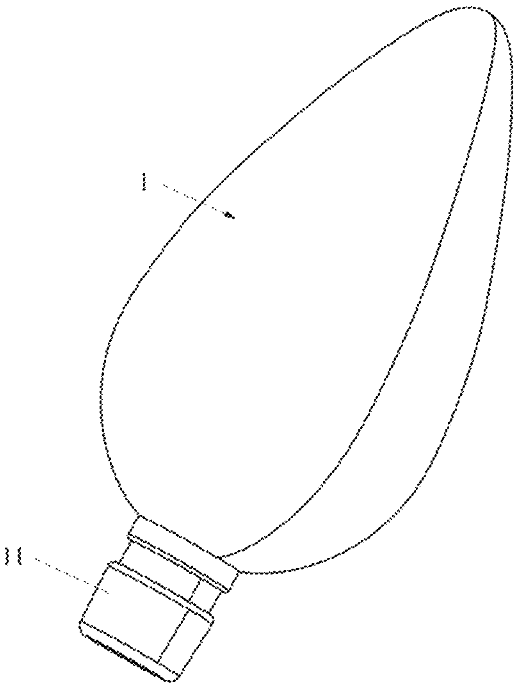
FIG. 21 is a schematic view of the structure of a lamp housing in another embodiment of the present application.
Figure 22:
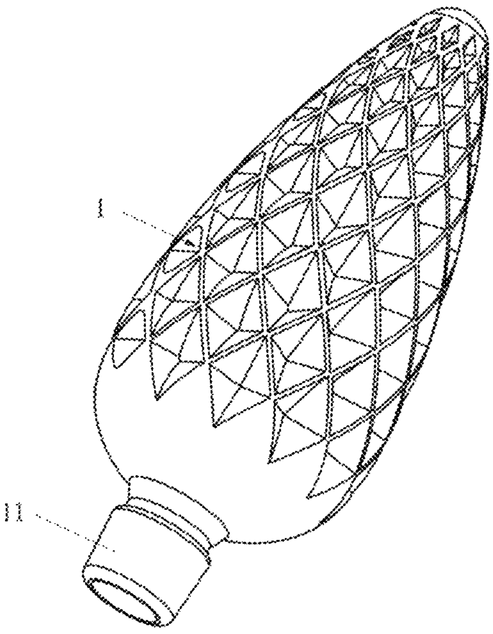
FIG. 22 is a schematic view of the structure of a lamp housing in another embodiment of the present application.
Figure 23:
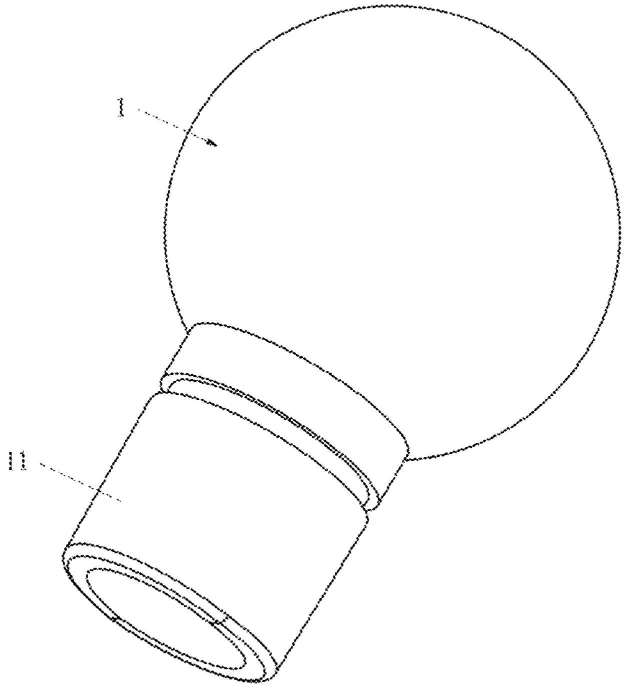
FIG. 23 is a schematic view of the structure of a lamp housing in another embodiment of the present application.
Figure 24:
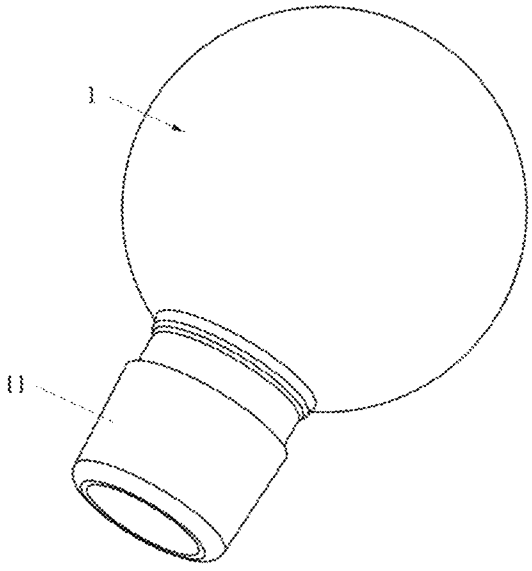
FIG. 24 is a schematic view of the structure of a lamp housing in another embodiment of the present application.
Figure 25:
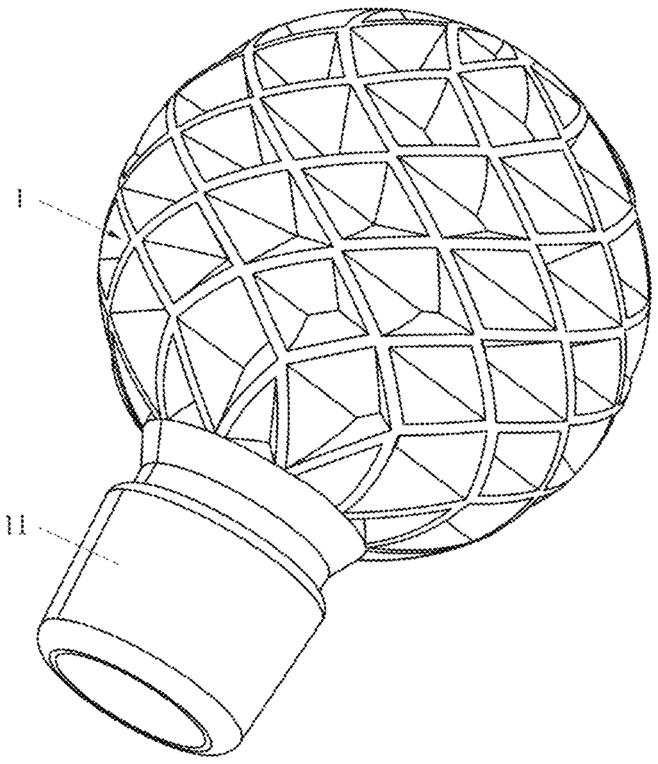
FIG. 25 is a schematic view of the structure of a lamp housing in another embodiment of the present application.
Figure 26:
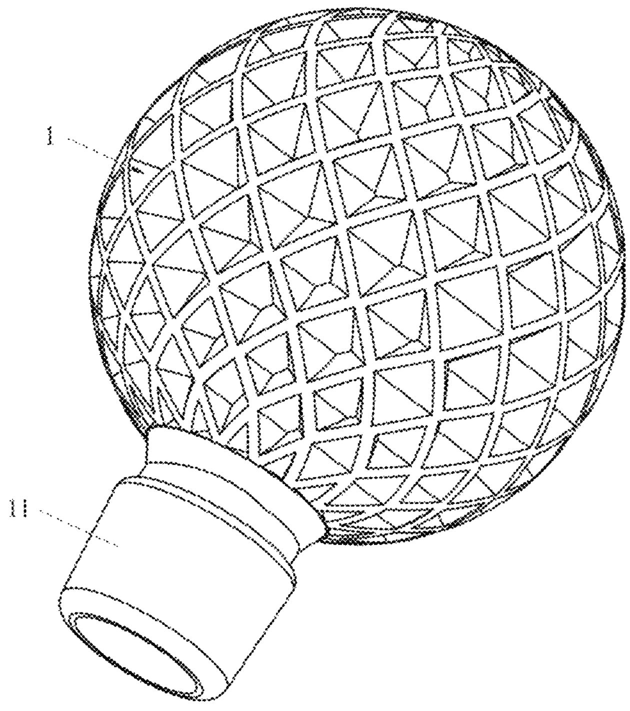
FIG. 26 is a schematic view of the structure of a lamp housing in another embodiment of the present application.
Figure 27:
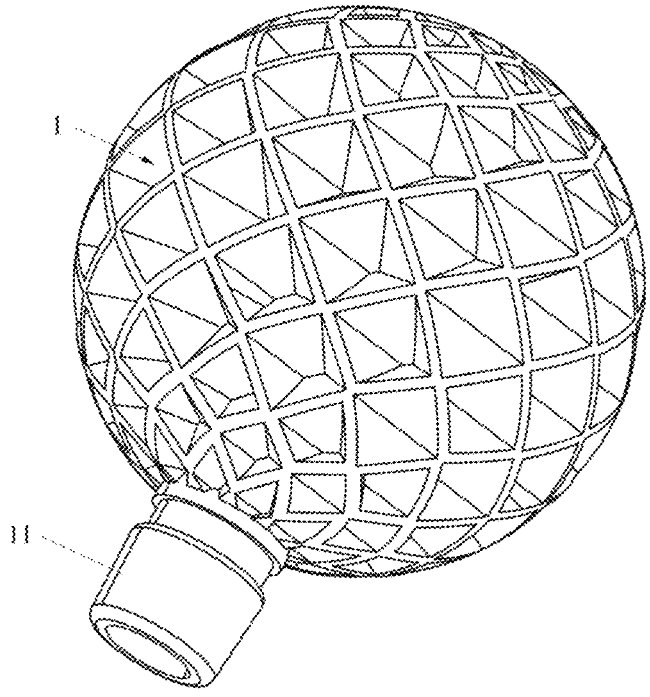
FIG. 27 is a schematic view of the structure of a lamp housing in another embodiment of the present application.
Figure 28:
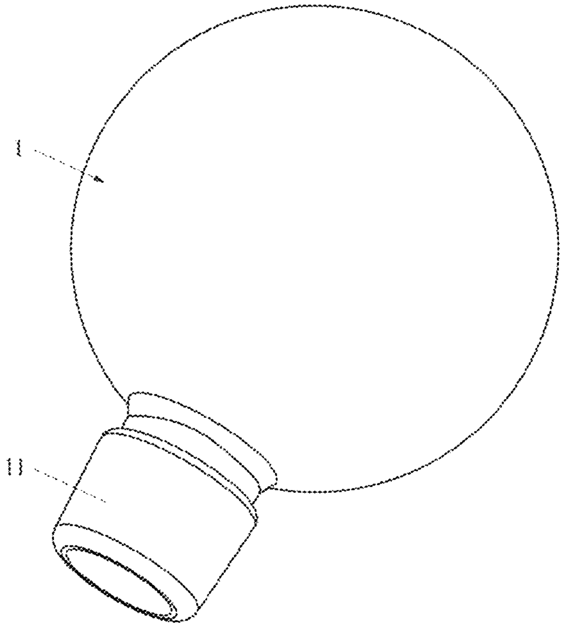
FIG. 28 is a schematic view of the structure of a lamp housing in another embodiment of the present application.
Figure 29:
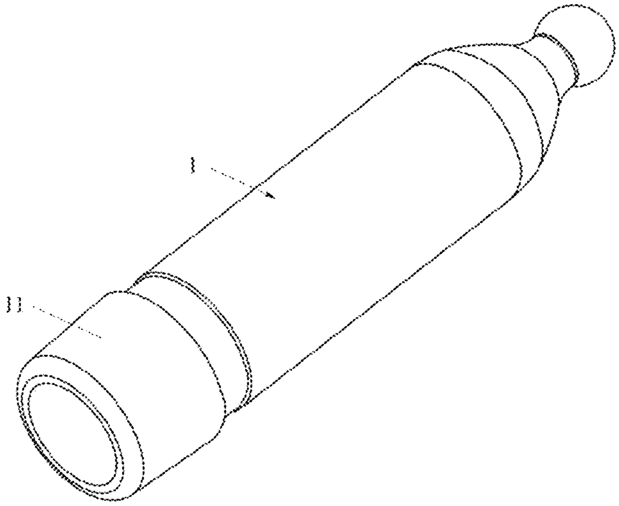
FIG. 29 is a schematic view of the structure of a lamp housing in another embodiment of the present application.

As shown in FIG. 13, in another example of the stopper 10, the stopper 10 is a plate elastically openable, which is integrally set on the holder 8, encloses and seals the portion of the wire slot 82 located around the power line 6.

The power line 6 comprises a male connector 71 connected to one end of the power line 6 and a female connector 72 connected to the other end of the power line 6 for connecting to a power source; it is understandable that, in some embodiment, the power line 6 comprises only one connector for connecting to a power source.

It is understandable that, in some embodiment, any one of the power line 6 and the connector can be removed to simplify the structure.

As shown in FIGS. 14-29, the shape of the lamp housing 1 is available in different shapes and textures depending on the needs, for example, the shape can be cylindrical, spherical, pear shaped, peach shaped, etc., but is not limited to them.

Figure 30:
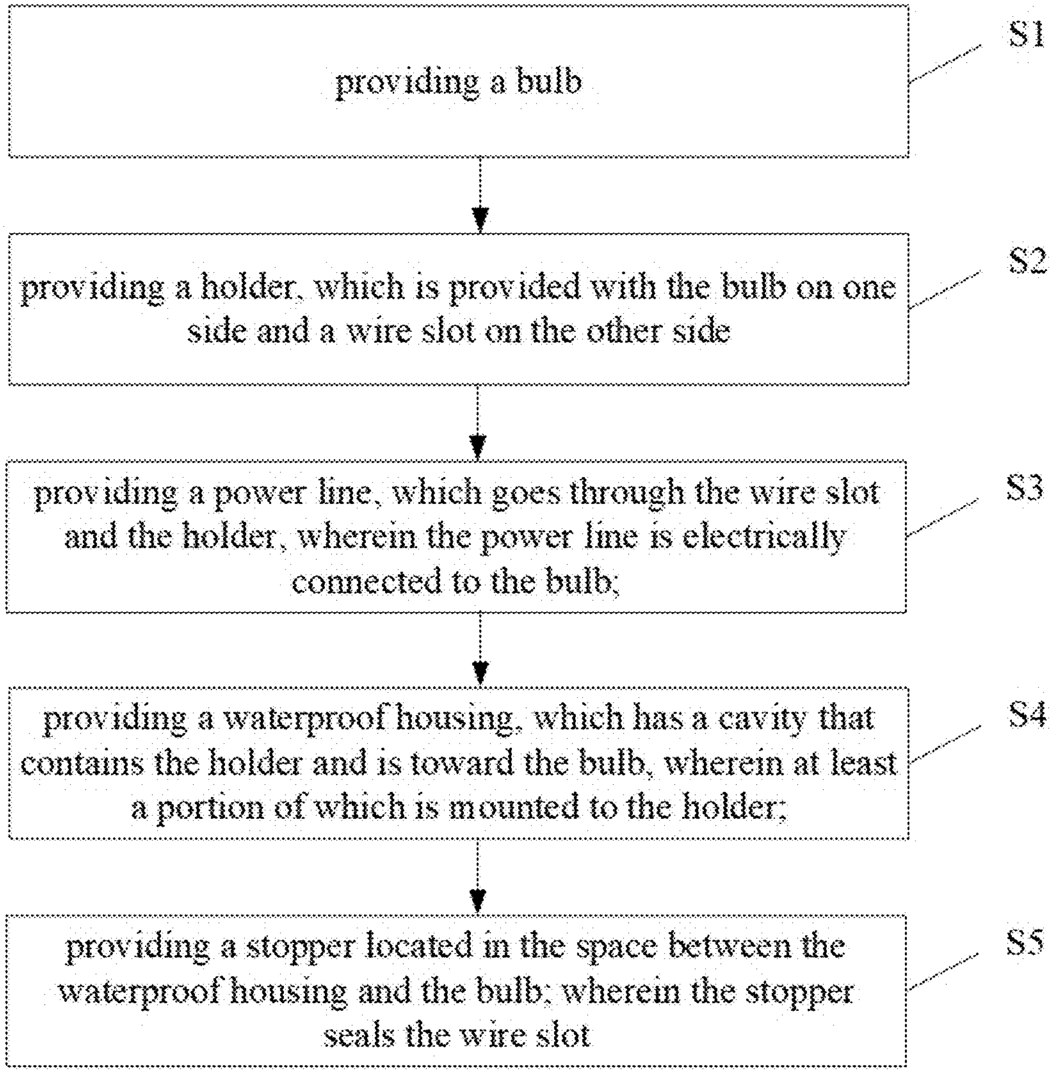
FIG. 30 is a flow diagram of a method for string light in an embodiment of the present application.

As shown in FIG. 30, a method for the string light 100 in any of the above embodiments is provided, comprises the following steps:

S1: providing a bulb 200;

S2: providing a holder 8, which is provided with the bulb 200 on one side and a wire slot 82 on the other side;

S3: providing a power line 6, which goes through the wire slot 82 and the holder 8, wherein the power line 6 is electrically connected to the bulb 200;

S4: providing a waterproof housing 12, which has a cavity that contains the holder 8 and is toward the bulb 200, wherein at least a portion of which is mounted to the holder 8;

S5: providing a stopper 10 located in the space between the lamp housing 12 and the bulb 200;

wherein the stopper 10 seals the wire slot 82.

The above mentioned is only the preferred embodiments of the present invention. For those of ordinary skill in the art, variations will be made in specific embodiments and application range in terms of concept of the present invention. The content in the description shall not be construed as limitations to the present invention.

What is claimed is:

1. A string light, comprising:

a bulb;

a holder, which is provided with the bulb on one side and a wire slot on the other side;

a power line, which goes through the wire slot and the holder, is electrically connected to the bulb;

a waterproof housing, which has a cavity that contains the holder and is toward the bulb, at least a portion of which is mounted to the holder; and a stopper located in a space between the waterproof housing and the bulb;

wherein the stopper is an elastically openable plate, which is integrally formed on the holder and seals a portion of the wire slot located around the power line.

2. The string light according to claim 1, wherein the bulb comprises a light source, a lamp housing, and a rubber core, one end of which has a mounting hole, the light source is located inside the mounting hole or the lamp housing, one end of the lamp housing toward the rubber core is inserted in the mounting hole.

3. The string light according to claim 2, wherein the light source comprises a lamp bead, which is connected to and supported by the rubber core.

4. The string light according to claim 3, wherein the light source further comprises a plurality of electrical contacts, each of the electrical contacts is electrically connected to the lamp bead.

5. The string light according to claim 4, wherein an other end of the rubber core has a through hole toward the wire slot, the through hole is communicated with the mounting hole, each of the electrical contacts goes through the mounting hole, through the through hole, bends toward the outer side of the through hole, and extends towards an outer wall of the rubber core in sequence.

6. The string light according to claim 4, wherein each electrical contact is a bent pin.

7. The string light according to claim 5, wherein the rubber core has a limiting and stopping portion extending from the light source through the mounting hole and toward the through hole, the limiting and stopping portion and the rubber core being integral.

8. The string light according to claim 2, wherein the lamp housing has a clamping portion corresponding to the mounting hole, the clamping portion being embedded in the mounting hole.

9. The string light according to claim 4, wherein a number of the electrical contacts is two or three.

10. The string light according to claim 2, wherein an outer wall of the rubber core has a shoulder.

11. A string light, comprising:

a bulb;

a holder, which is provided with a bulb on one side and a wire slot on the other side;

a waterproof housing having a cavity for containing the holder to which the bulb is mounted; and a stopper located in a space between the waterproof housing and the bulb;

wherein the stopper is an elastically openable plate, which is integrally formed on the holder and seals a portion of the wire slot located around a power line.

12. The string light according to claim 11, wherein the bulb comprises a light source, a lamp housing, and a rubber core, one end of which has a mounting hole, the light source is located inside the mounting hole or the lamp housing, one end of the lamp housing toward the rubber core is inserted in the mounting hole.

13. The string light according to claim 12, wherein the light source comprises a lamp bead, which is connected to and supported by the rubber core.

14. The string light according to claim 13, wherein the light source further comprises a plurality of electrical contacts, each of the electrical contacts is electrically connected to the lamp bead.

15. The string light according to claim 14, wherein an other end of the rubber core has a through hole toward the wire slot, the through hole is communicated with the mounting hole, each of the electrical contacts goes through the mounting hole, through the through hole, bends toward the outer side of the through hole, and extends towards an outer wall of the rubber core in sequence.

16. The string light according to claim 14, wherein each electrical contact is a bent pin.

17. The string light according to claim 15, wherein the rubber core has a limiting and stopping portion extending from the light source through the mounting hole and toward the through hole, the limiting and stopping portion and the rubber core being integral.

18. The string light according to claim 12, wherein the lamp housing has a clamping portion corresponding to the mounting hole, the clamping portion being embedded in the mounting hole.

19. The string light according to claim 12, wherein an outer wall of the rubber core has a shoulder.

20. A method for string light, comprising:

providing a bulb;

providing a holder, which is provided with the bulb on one side and a wire slot on the other side;

providing a power line, which goes through the wire slot and the holder, wherein the power line is electrically connected to the bulb;

providing a waterproof housing, which has a cavity that contains the holder and is toward the bulb, wherein at least a portion of which is mounted to the holder;

providing a stopper located in a space between the waterproof housing and the bulb;

wherein the stopper is an elastically openable plate, which is integrally formed on the holder and seals a portion of the wire slot located around the power line.

* * * * *